United States Patent [19]

Howard

[11] Patent Number: 4,727,603
[45] Date of Patent: Mar. 1, 1988

[54] GARMENT WITH LIGHT-CONDUCTING FIBERS

[76] Inventor: Rebecca L. Howard, 825-27th St., Denver, Colo. 80205

[21] Appl. No.: 22,643

[22] Filed: Mar. 6, 1987

[51] Int. Cl.⁴ .............................................. A41B 1/00
[52] U.S. Cl. ...................................... 2/243 R; 2/115; 362/103; 362/806
[58] Field of Search ............... 2/243 R, 244, 115, 133; 362/32, 103, 104, 105, 106, 806

[56] References Cited

U.S. PATENT DOCUMENTS

| | | | |
|---|---|---|---|
| 3,675,005 | 7/1972 | Curiel | 362/103 X |
| 3,758,771 | 9/1973 | Frohardt et al. | 362/32 |
| 4,164,008 | 8/1979 | Miller et al. | 362/103 |
| 4,234,907 | 11/1980 | Daniel | 362/806 X |
| 4,480,293 | 10/1984 | Wells | 362/103 X |
| 4,652,981 | 3/1987 | Glynn | 362/103 |

*Primary Examiner*—Louis K. Rimrodt
*Assistant Examiner*—J. L. Olds
*Attorney, Agent, or Firm*—Gregg I. Anderson

[57] ABSTRACT

An article of clothing is decorated with light-conducting fibers having varying lengths of exposed segments forming a design on the outer surface of the garment with the remainder segments of the fibers being collected on the opposite side of the clothing and gathered into a bundle that is connected to a light source for emitting light into the fibers. A method of making such a decorated garment is also disclosed.

6 Claims, 6 Drawing Figures

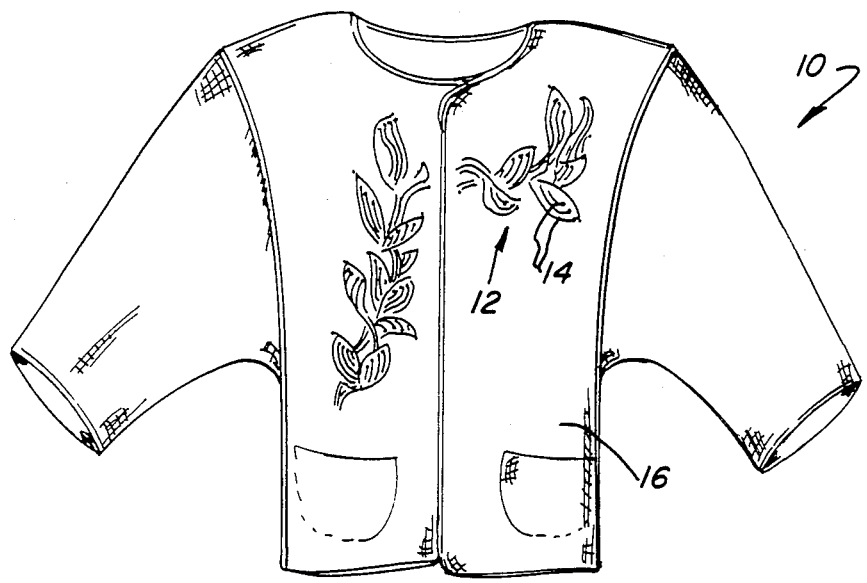
Fig_1
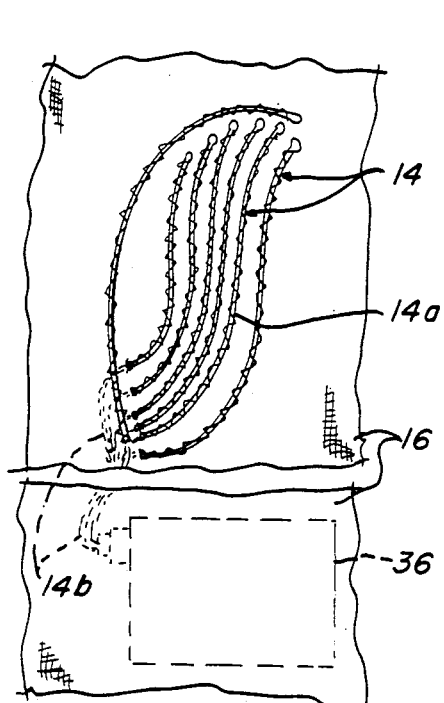
Fig_2
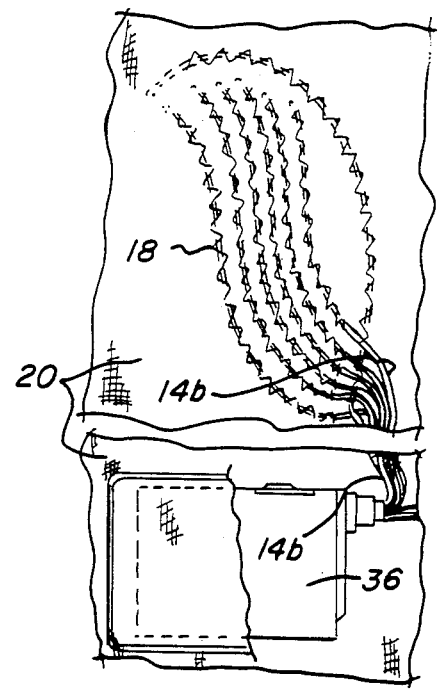
Fig_3

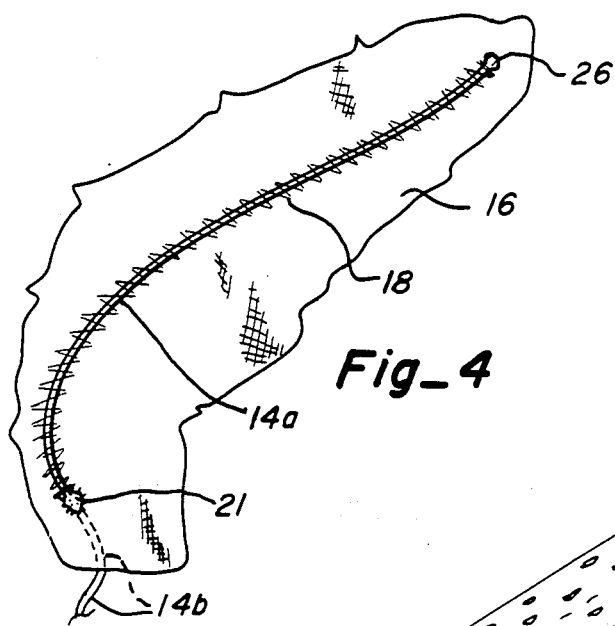
Fig_4
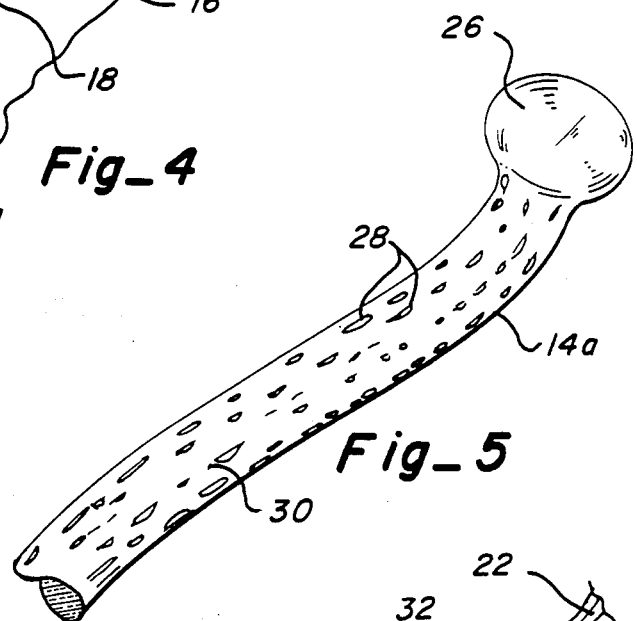
Fig_5
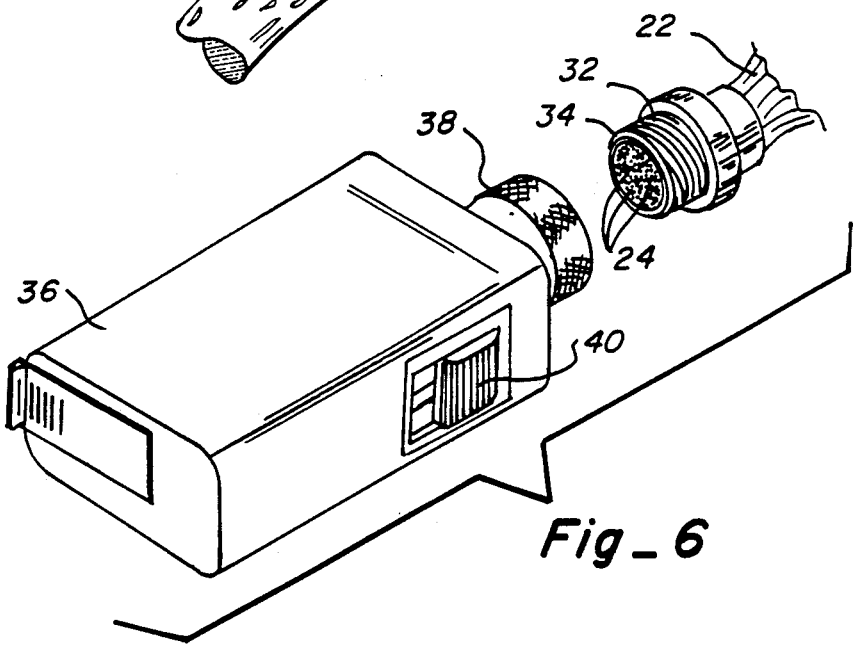
Fig_6

GARMENT WITH LIGHT-CONDUCTING FIBERS

BACKGROUND OF THE INVENTION

1. Field of the Invention

The present invention relates generally to articles of clothing and more particularly to a garment having a plurality of light-conducting fibers forming a decorative pattern thereon.

2. Description of the Prior Art

Since the advent of light-emitting fibers which are typically utilized to transmit light from a source to a remote location, numerous uses for such fibers have evolved. Many of these uses have been in the decorative field, some in the form of house furnishings and some in the form of accessories for personal use. In this latter category have been articles of jewelry, see for example U.S. Pat. No. 4,009,381 issued to Schreiber, et al., illuminated wigs such as of the type disclosed in U.S. Pat. No. 3,758,771 of Frohardt, et al., and similarly a coiffeur decorating apparatus for use in the hair disclosed in U.S. Pat. No. 3,675,005 of Curiel. Another patent of interest is U.S. Pat. No. 4,234,907 of Daniel which discloses a light-emitting fabric woven from optical fibers that can be used in clothing or for home decorating purposes in rugs, draperies and the like. Other uses of light-emitting fibers have been found for illuminating flags or pennants wherein the ends of the fibers are positioned in the pennant to form numbers or letters as desired.

Typically the light rays which are fed into the fibers at one end are transmitted along the length of the fiber and emitted at the opposite end but there is no leakage of light between the ends. For some purposes, such as disclosed in the aforenoted patent to Daniel and also in U.S. Pat. No. 3,535,018 of Vasilatos, the surface of the fiber is either notched or scratched so that light is emitted along the length of the fiber as desired.

While the use of light-emitting fibers is extensive and has even penetrated the clothing market, such use has not been in the form of decorations on articles of clothing and it is to this end that the present invention was conceived and developed.

SUMMARY OF THE INVENTION

The present invention concerns an article of clothing wherein segments of light-conducting fibers are stitched onto the outer surface of an article of clothing to form a decorative pattern thereon and with remaining portions of each fiber being disposed on the opposite side of the clothing. In this manner, the remaining portions of the fibers are hidden from view and in an orientation where a plurality of such fibers can be gathered into a bundle and disposed in a hidden location on the clothing where a light source can be connected thereto to emit rays of light into the fibers.

The fibers utilized in the decoration of the clothing are modified as by enlarging the exposed ends of the fibers so that light is readily visible therethrough and also by recessing the longitudinal surfaces of the exposed fiber segments so as to permit light to be emitted laterally through the exposed longitudinal surfaces of the fibers along the patterns of decoration on the clothing.

A method of decorating an article of clothing is also disclosed and includes the steps of drawing a design on the outer surface of a garment, placing end segments of a plurality of light-conducting fibers along the design drawn on the clothing, affixing the end segments of the fibers to the garment, establishing holes through the garment, passing the remainder portion of each fiber through the holes in the garment, gathering the remainder portions on the opposite surface of the garment from the design, placing the remainder portions of the fibers in a bundle, and emitting light into the ends of the remainder portions of the fibers so that the light is carried through the fibers and disbursed through the segments thereof which are exposed on the outer surface of the garment.

Following the above method, it has been found that numerous artistic displays of light-emitting fibers can be incorporated into an article of clothing to provide an attractive garment that is quite distinctive in appearance.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a front plan view of a garment with a fiber optic design thereon in accordance with the present invention.

FIG. 2 is an enlarged fragmentary front plan view of a portion of FIG. 1.

FIG. 3 is a rear plan view similar to FIG. 2 showing the reverse side of the fabric.

FIG. 4 is a further enlarged fragmentary front plan view of a single fiber stitched to the front of the garment.

FIG. 5 is a still further enlarged perspective view of a segment of fiber showing recesses in the longitudinal surface thereof and a bulbous head on the end of the fiber.

FIG. 6 is an enlarged perspective view of the connection between the fibers and a light source.

DESCRIPTION OF THE PREFERRED EMBODIMENT

Referring first to FIG. 1, an article of clothing 10 in the form of a garment is illustrated having a floral design 12 carried on its front. The floral design 12 is made up of a plurality of light-emitting fibers 14 having various lengths and light-emitting characteristics as will be described hereinafter.

The light-emitting fibers 14 are of a conventional type being composed of a flexible tubular plastic material that is adapted to conduct light that is emitted into one end to the opposite end without leakage of light along the length of the fiber. In accordance with the present invention, end segments 14a of the fibers are placed on an outer surface 16 of the garment at a predetermined location and affixed to that surface as by stitching 18 or adhesive means. The remainder portions 14b of the fibers which are not to be utilized in the decorative design are passed through holes 18 provided in the fabric of the garment so as to extend along the opposite surface 20 from that on which the design is disposed. Dabs 21 of glue are placed on the fabric and over the fibers and holes 18 through which they pass to hold the fibers in place. The remainder portions 14b of the fibers which are on the back surface 20 of the fabric can be affixed to the fabric or to a lining (not shown) for the garment and gathered so that the ends of the fibers are bundled at 22 with the fibers in the bundle extending parallel to each other and having their terminal ends 24 coplanar.

The exposed segments 14a of the fibers 14 which are on the outer surface 16 of the garment and forming the decoration thereon may be of varying lengths preferrably in the range of one inch to seven inches. These segments can be placed and interrelated in many different patterns to form the decorative look desired and t this end modifications to the conventional fibers are made. One modification is obtained by heating the ends of the fiber segments 14a so that an enlarged bead or bulbous bead 26 is formed that emits light through a multitude of directions. Another form of modifying the characteristics of the fiber 14 consists of recessing the longitudinal surface 30 of the fiber as at 28 (FIG. 5) so that light can be emitted laterally through the longitudinal surface along the exposed segment 14a of fiber on the outer surface of the garment. This recessing can be done by several methods, but a preferred method has been to sandpaper the longitudinal surface 30 so as to form an irregular or random pattern of recesses.

The bundled ends of the remainder portions 14b of the fibers which are collected on the back side 20 of the fabric from the design itself are incapsulated in a male connector 32 having external threads thereon. It is important to note, however, in FIG. 6 that the coplanar ends 24 of the fibers 14 are exposed through an open end 34 of the connector. The connector is adapted to be threaded into a hidden light source 36 having a female attachment head 38 into which the male connector 32 can be threaded. The light source can be of any suitable type similar to a flashlight wherein a battery source of power is contained along with a directed source of light and an on/off switch 40. The source of light 36, of course, is directed out through the female attachment head 38 whereby when the light source is connected to the light-conducting fibers 14, the light is directed into the coplanar ends 24 of the fibers so that the light can be conducted to the exposed segments 14a thereof on the outer surface of the garment.

It can be appreciated from the above that the fiber optic design 12 on the garment can take many different forms due to the variations in the light-emitting characteristics of the fibers which are possible and by varying the lengths of the segments 14a of fibers which are exposed on the outer surface of the garment. Of course, the segments 14a of fibers on the outer surface can also be manipulated into various forms and configurations so that numerous designs can be created.

In the method of making a garment IO decorated with light-conducting fibers 14, the first step is to create a design 12 on the outer surface 16 of the garment as by stenciling or freehand drawing. The exposed segments 14a of the fibers can then be laid along the lines of decoration and affixed in position preferably by stitching 18 or with a suitable adhesive. The remainder portions 14b of the fibers which are not needed or desired in the particular design are passed through holes 18 formed in the fabric to receive such remainder portions and are sewn or otherwise affixed either to the back side 20 of the fabric or to a liner if in fact a liner is provided for the garment. The remainder portions 14b of the fibers are next gathered on the underside of the fabric so that the fibers are placed in parallel relationship defining a bundle 22 of such fibers with the terminal ends 24 of the fibers in a coplanar orientation. An externally threaded male connector 32 is then placed around the bundle of fibers with the connector having an open end which is preferably coplanar with the ends 24 of the fibers. A light source 36 is then provided with battery power and a female connector 38 for connection to the male connector whereby light rays can be emitted into the coplanar ends 24 of the fibers and conducted through the fibers to the exposed segments 14a of the fibers on the outside surface of the garment.

Further steps in the method might include heating the ends of the fiber segments to form enlarged bulbs 26 and recessing as by sandpapering the longitudinal surface of the exposed fiber segments 14a whereby light can be emitted laterally through the fiber segments in a random or predetermined pattern.

Although the present invention has been described with a certain degree of particularity, it is understood that the present disclosure has been made by way of example, and changes in detail or structure may be made without departing from the spirit of the invention, as defined in the appended claims.

I claim:

1. An article of clothing including a display of light-conducting fibers wherein a segment of each fiber is affixed to an outer surface of the clothing to form a decorative pattern thereon and wherein said clothing includes a plurality of openings therethrough through which individual fibers are passed so that the remainder portion of each fiber is disposed adjacent to the opposite surface of the clothing, said remainder portion of the fibers being gathered at their ends into a bundle adjacent to said opposite surface, and a light source connected to said bundle so as to emit rays of light into the bundled ends of said fibers.

2. The article of clothing of claim 1 wherein at least some of said segments of the fibers have their surfaces recessed to permit lateral emission of light along said segments.

3. The article of clothing of claim 2 wherein the ends of said fiber segments on the outer surface of the clothing are bulbous to emit light therethrough.

4. The article of clothing of claim 1 wherein the segments of the fibers that are on the outer surface of the clothing have a length in the range of 1" to 7".

5. A method of decorating an article of clothing comprising the steps of:
    drawing a design on the outer surface of the clothing,
    placing end segments of a plurality of light-conducting fibers along the design drawn on the clothing,
    affixing the end segments on the fibers to the clothing,
    establishing holes through the clothing,
    passing the remainder portions of each fiber through holes in the clothing,
    gathering the remainder portions on the opposite surface of said clothing so that the ends of the remainder portions are in a bundle, and
    emitting light into the ends of the remainder portions of the fibers.

6. The method of claim 5 further including the step of recessing the surfaces of the segments of fibers on said outer surface of the clothing whereby light is emitted laterally through said surfaces of the fiber segments.

* * * * *